United States Patent
Okubo

(10) Patent No.: US 11,139,752 B2
(45) Date of Patent: Oct. 5, 2021

(54) POWER CONVERSION DEVICE WITH WIRING HAVING DIFFERENT PARASITIC INDUCTANCES

(71) Applicant: DENSO CORPORATION, Kariya (JP)

(72) Inventor: Takuya Okubo, Kariya (JP)

(73) Assignee: DENSO CORPORATION, Kariya (JP)

(*) Notice: Subject to any disclaimer, the term of this patent is extended or adjusted under 35 U.S.C. 154(b) by 54 days.

(21) Appl. No.: 16/740,984

(22) Filed: Jan. 13, 2020

(65) Prior Publication Data

US 2020/0295672 A1 Sep. 17, 2020

(30) Foreign Application Priority Data

Mar. 14, 2019 (JP) .............................. JP2019-047417

(51) Int. Cl.
| | |
|---|---|
| *H02M 7/00* | (2006.01) |
| *H02M 7/5387* | (2007.01) |
| *H02M 1/44* | (2007.01) |
| *H02M 1/32* | (2007.01) |
| H02M 3/155 | (2006.01) |

(52) U.S. Cl.
CPC ........... *H02M 7/5387* (2013.01); *H02M 1/32* (2013.01); *H02M 1/44* (2013.01); *H02M 7/003* (2013.01); H02M 3/1555 (2021.05)

(58) Field of Classification Search
CPC ............ H02M 1/44; H02M 1/32; H02M 1/14; H02M 2001/123; H02M 2003/1555; H02P 27/06

See application file for complete search history.

(56) References Cited

U.S. PATENT DOCUMENTS

| | | | |
|---|---|---|---|
| 2005/0024805 A1* | 2/2005 | Heilbronner | H02M 7/003 361/100 |
| 2007/0109715 A1* | 5/2007 | Azuma | H02M 7/003 361/299.3 |
| 2011/0249421 A1 | 10/2011 | Matsu et al. | |
| 2014/0085955 A1* | 3/2014 | Maeda | H02M 7/003 363/132 |
| 2014/0133199 A1 | 5/2014 | Matsuo et al. | |
| 2017/0063218 A1 | 3/2017 | Nishizawa et al. | |
| 2018/0123445 A1 | 5/2018 | Nishizawa et al. | |
| 2018/0206357 A1* | 7/2018 | Friedlund | H02M 7/003 |
| 2019/0109532 A1 | 4/2019 | Nishizawa et al. | |
| 2020/0021202 A1* | 1/2020 | Okaura | H02M 7/003 |

* cited by examiner

*Primary Examiner* — Kyle J Moody
*Assistant Examiner* — Jye-June Lee
(74) *Attorney, Agent, or Firm* — Oliff PLC

(57) ABSTRACT

A power conversion device includes an inverter, a smoothing capacitor, Y capacitors, and a power supply wiring that electrically connects a DC power supply and the inverter. The power supply wiring includes power terminal portions to which the DC power supply is connected, power terminal portions to which the inverter is connected, and capacitor terminal portions to which the Y capacitors are connected. In the power supply wiring, a parasitic inductance L1 between the power terminal portions and the capacitor terminal portions are made smaller than a parasitic inductance L2 between the power supply terminal portions and the capacitor terminal portions.

10 Claims, 8 Drawing Sheets

COMPARISON EXAMPLE

POWER CONVERSION DEVICE WITH WIRING HAVING DIFFERENT PARASITIC INDUCTANCES

CROSS REFERENCE TO RELATED APPLICATION

The present application claims the benefit of priority from Japanese Patent Application No. 2019-047417 filed on Mar. 14, 2019. The entire disclosures of the above application are incorporated herein by reference.

FIELD

The present disclosure relates to a power conversion device.

BACKGROUND

A conventional power conversion device is provided with an inverter provided between a DC power supply and a rotary electric machine, a smoothing capacitor that smoothes DC power, a Y capacitor that removes noise, and conductors. The conductors include a power supply side terminal to which the DC power supply is connected, a power terminal to which the inverter is connected, and a capacitor terminal to which the capacitor is connected. In the power conversion device, a Y capacitor terminal is formed in the vicinity of the power supply side terminal in the conductors.

SUMMARY OF THE DISCLOSURE

The present disclosure has an object to provide a power conversion device that can effectively absorb common mode noise.

According to the present disclosure, a power conversion device comprises a power conversion portion, a first capacitor, a second capacitor, a wiring. The power conversion portion includes a switching element for power conversion between a DC power and an AC power. The first capacitor is provided for smoothing the DC power supplied from a DC power supply. The second capacitor is provided for removing noise. The wiring includes a positive wiring connected to a positive polarity side of the DC power supply and a negative wiring connected to a negative polarity side of the DC power supply and electrically connecting the DC power supply and the power conversion portion.

DETAILED DESCRIPTION OF THE EMBODIMENT

Figure 1:
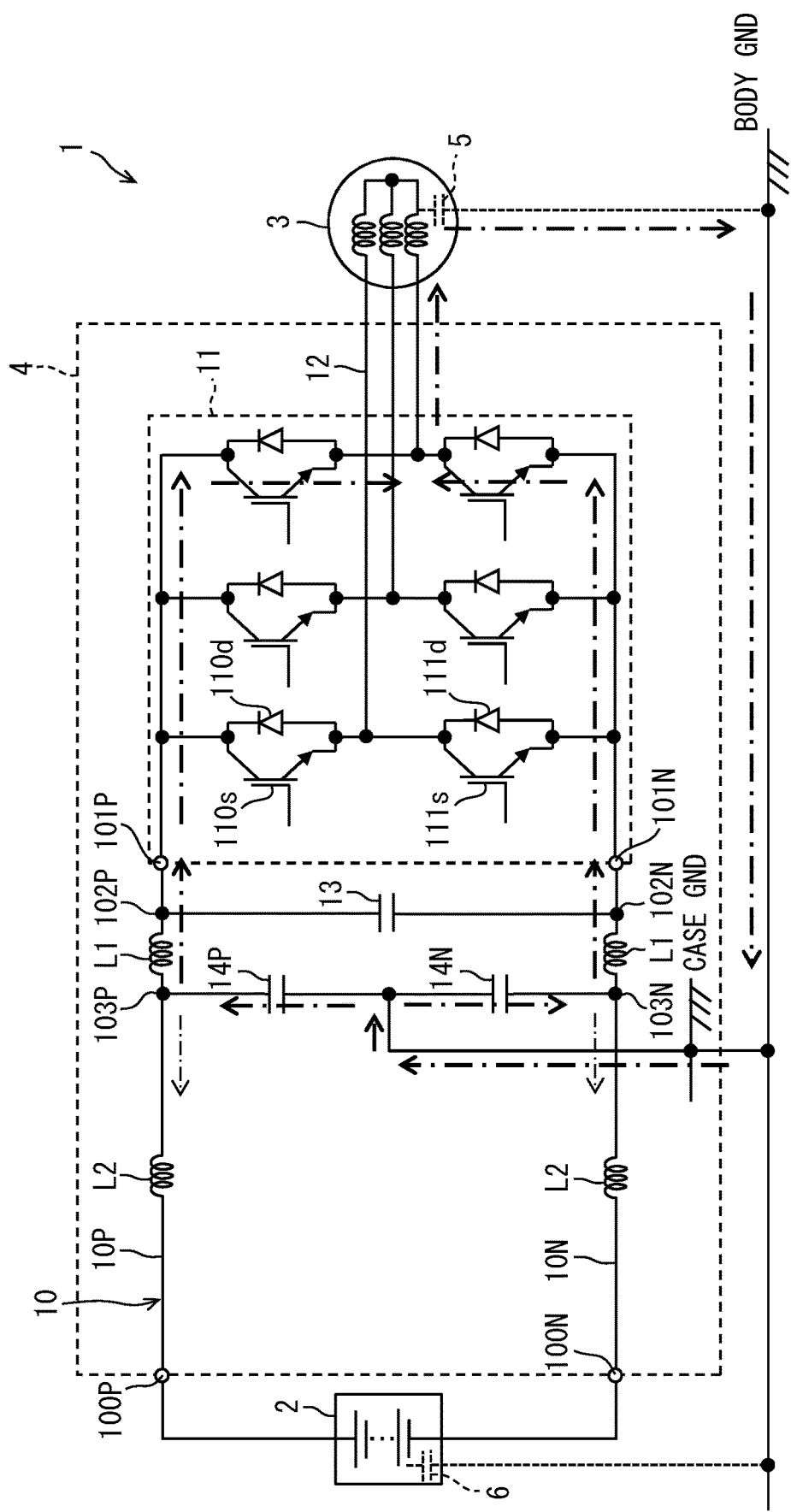
FIG. 1 is a diagram illustrating a circuit configuration of a power conversion device according to a first embodiment.

Various embodiments of a power conversion device according to the present disclosure will be described below with reference to the accompanying drawings. In the embodiments, functionally and/or structurally corresponding portions are designated with the same reference numerals. The power conversion device shown below is applicable to vehicles, such as an electric vehicle (EV) and a hybrid vehicle (HV), for example.

First Embodiment

First, a schematic configuration of a vehicle drive system to which a power conversion device is applied will be described with reference to FIG. 1.

<Vehicle Drive System>

As shown in FIG. 1, a vehicle drive system 1 is provided with a DC power supply 2, a motor generator 3 and a power conversion device 4.

The DC power supply 2 is a high DC voltage source formed of a secondary battery, which is capable of charging and discharging, such as a lithium ion battery or a nickel metal hydride battery. The motor generator 3 is a three-phase AC type rotary electric machine. The motor generator 3 functions as a vehicle driving power source, that is, an electric motor. The motor generator 3 functions also as a generator during regeneration. The power conversion device 4 performs power conversion between the DC power supply 2 and the motor generator 3.

<Circuit Configuration of Power Conversion Device>

Next, a circuit configuration of the power conversion device 4 will be described. As shown in FIG. 1, the power conversion device 4 is provided with a power supply wiring 10, an inverter 11, an output wiring 12, a smoothing capacitor 13 and Y capacitors 14N and 14P. The power conversion device 4 may further be provided with a drive circuit for switching elements 110s and 111s of the inverter 11.

The power supply wiring 10 is a wiring part that electrically connects the DC power supply 2 and the inverter 11. The power supply wiring 10 has a positive polarity side wiring 10P and a negative polarity side wiring 10N. The power supply wiring 10 is provided as a wiring having a positive polarity side wiring and a negative polarity side wiring. The positive polarity side wiring 10P is connected to a positive electrode side of the DC power supply 2. The positive electrode of the DC power supply 2 is connected to aa power supply terminal portion 100P of the positive polarity side wiring 10P. The negative polarity side wiring 10N is connected to a negative electrode side of the DC power supply 2. The negative electrode of the DC power supply 2 is connected to a power supply terminal portion 100N of the negative polarity side wiring 10N. The power supply terminal portions 100N and 100P are provided as a third connection portion of the wiring.

The power supply wiring 10 may be referred to as a power supply line. The positive polarity side wiring 10P may be referred to as a P line or a high potential power supply line. The negative polarity side wiring 10N may be referred to as an N line or a low potential power supply line.

The inverter 11 is a power conversion circuit unit. The inverter 11 is a DC-AC converter. The inverter 5 converts an input DC power into a three-phase AC power having a predetermined frequency, and outputs the three-phase AC power to the motor generator 3 to drive the motor generator 3. The inverter 11 converts an AC power generated by the motor generator 3 into a DC power.

The inverter 11 is configured to have a high side arm circuit, which is on a high potential side, and a low side arm circuit, which is on a low potential side, for three phases. The high side and low side arm circuits of each phase are formed by connecting two arms in series between the positive polarity side wiring 10P and the negative polarity side wiring 10N. In the high side and low side arm circuits, a connection point between the high side arm on the high potential side and the low side arm on the low potential side is connected to the output wiring 12 connected to the motor generator 3.

The high side arm includes a switching element 110s and a freewheeling diode 110d connected in parallel and in reverse polarity to the switching element 110s. The low side arm includes a switching element 111s and a freewheeling diode 111d connected in parallel and in reverse polarity to the switching element 111s. In the first embodiment, a n-channel type insulated gate bipolar transistor (hereinafter referred to as an IGBT) is employed for each switching element 110s, 111d. A drive circuit (not shown) outputs a drive signal to switch over the switching elements 110s and 111s at a high frequency as known well in the art.

In the high side arm, a collector electrode of the switching element (IGBT) 110s is connected to a power terminal portion 101P of the positive polarity side wiring 10P. In the low side arm, an emitter electrode of the switching element (IGBT) 111s is connected to a power terminal portion 101N of the negative polarity side wiring 10N. An emitter electrode of the switching element 110s in the high side arm and a collector electrode of the switching element 111s in the low side arm are connected to each other. The power supply terminal portions 101N and 101P are provided as a first connection portion of the wiring.

The smoothing capacitor 13 smoothes a DC voltage supplied from the DC power supply 2 side. The smoothing capacitor 13 suppresses fluctuations in the DC voltage caused by switching operations of the switching elements 110s and 111s. The smoothing capacitor 13 is provided as a first capacitor. The smoothing capacitor 13 is connected between the positive polarity side wiring 10P and the negative polarity side wiring 10N. The smoothing capacitor 13 is connected in parallel to the inverter 11. A positive electrode of the smoothing capacitor 13 is connected to a capacitor terminal portion 102P of the positive polarity side wiring 10P. A negative electrode of the smoothing capacitor 13 is connected to a capacitor terminal portion 102P of the negative polarity side wiring 10N.

Y capacitors 14N and 14P are provided to remove noise. The Y capacitors 14N and 14P suppress common mode noise. The Y capacitors 14N and 14P may be referred to as common mode capacitors. One terminal of the Y capacitor 14P is connected to a capacitor terminal portion 103P of the positive polarity side wiring 10P, and the other terminal of the Y capacitor 14P is connected to the ground (GND). One terminal of the Y capacitor 14N is connected to a capacitor terminal portion 103N of the negative polarity side wiring 10P, and the other terminal of the Y capacitor 14N is connected to the ground (GND). In the vehicle, the Y capacitors 14N and 14P are electrically connected to a body ground such as a chassis via a case ground of the power conversion device 4. In FIG. 1, the case ground and the body ground are shown as a case GND and a body GND.

The Y capacitors 14N and 14P are provided as a second capacitor. The power supply terminal portions 103N and 103P are provided as a second connection portion of the wiring. The Y capacitor 14P is provided as a positive side capacitor, and the Y capacitor 14N is provided as a negative side capacitor.

As shown in FIG. 1, a parasitic capacitance 5 exists in, for example, the winding of the motor generator 3. Similarly, a parasitic capacitance 6 exists in the DC power supply 2. The parasitic capacitances 5 and 6 are also referred to as stray capacitances. The common mode noise is a noise current that propagates through the body ground as a flow path when a potential change relative to the body ground due to the switching operation of the switching elements 110s and 111s charges and discharges the parasitic capacitances 5 and 6 described above.

If the Y capacitors 14N and 14P are not provided, the common mode noise flows from the inverter 11 to the inverter 11 through the output wiring 12, the motor generator 3 (parasitic capacitance 5), the body ground, the DC power supply 2 (parasitic capacitance 6), the power supply wiring 10. Therefore, a current loop is large.

In the first embodiment, the Y capacitors 14N and 14P are provided between the power supply terminal portions 100N and 100P and the power terminal portions 101N and 101P in the power supply wiring 10. Therefore, a flow path of the common mode noise is formed from the inverter 11 to the inverter 11 through the output wiring 12, the motor generator 3 (parasitic capacitance 5), the body ground, the Y capacitors 14N and 14P and the power supply wiring 10. By thus providing the Y capacitors 14N and 14P, a small loop current path is formed.

In particular, in the first embodiment, a parasitic inductance of the power supply wiring 10 satisfies a predetermined relationship to suppress leakage of the common mode noise to the DC power supply 2 side. Here, in the power supply wiring 10, a parasitic inductance of the power supply wiring 10 between the capacitor terminal portions 103N and 103P and the power terminal portions 101N and 101P is assumed to be L1. Further, a parasitic inductance of the power supply wiring 10 between the capacitor terminal portions 103N and 103P and the power supply terminal portions 100N and 100P is assumed to be L2. The parasitic inductance L1 is a first parasitic inductance, and the parasitic inductance L2 is a second parasitic inductance.

In the first embodiment, in the power supply wiring 10, the parasitic inductance L1 is set to be smaller than the parasitic inductance L2. Specifically, in the positive polarity side wiring 10P, the parasitic inductance L1 is set to be smaller than the parasitic inductance L2. In the negative polarity side wiring 10N, the parasitic inductance L1 is set to be smaller than the parasitic inductance L2. The parasitic inductance is made smaller by shortening the power supply wiring 10. Thereby, the impedance of the power supply wiring 10 is smaller on the inverter 11 side than on the DC power supply 2 side from the capacitor terminal portions 103N and 103P. Therefore, the common mode noise tends to flow to the inverter 11 side having a small impedance in the power supply wiring 10 and hardly flows to the DC power supply 2 side having a large impedance.

Since the common mode noise hardly leaks from the capacitor terminal portions 103N and 103P to the DC power supply 2 side, the common mode noise can be effectively absorbed in the above-described closed loop circuit including the Y capacitors 14N and 14P.

<Configuration of Power Conversion Device>

Figure 2:
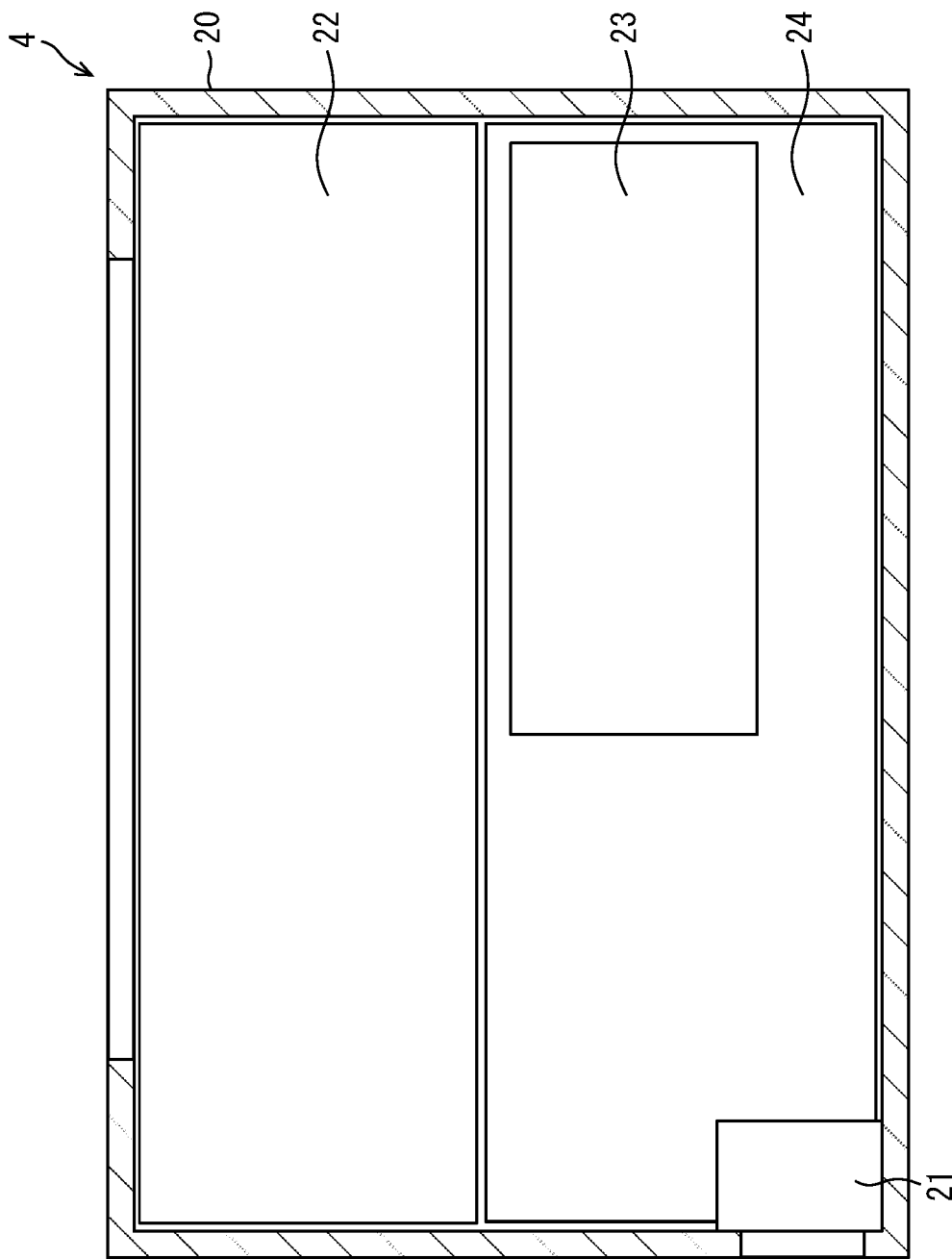
FIG. 2 is a plan view showing a schematic configuration of the power conversion device shown in FIG. 1.
Figure 3:
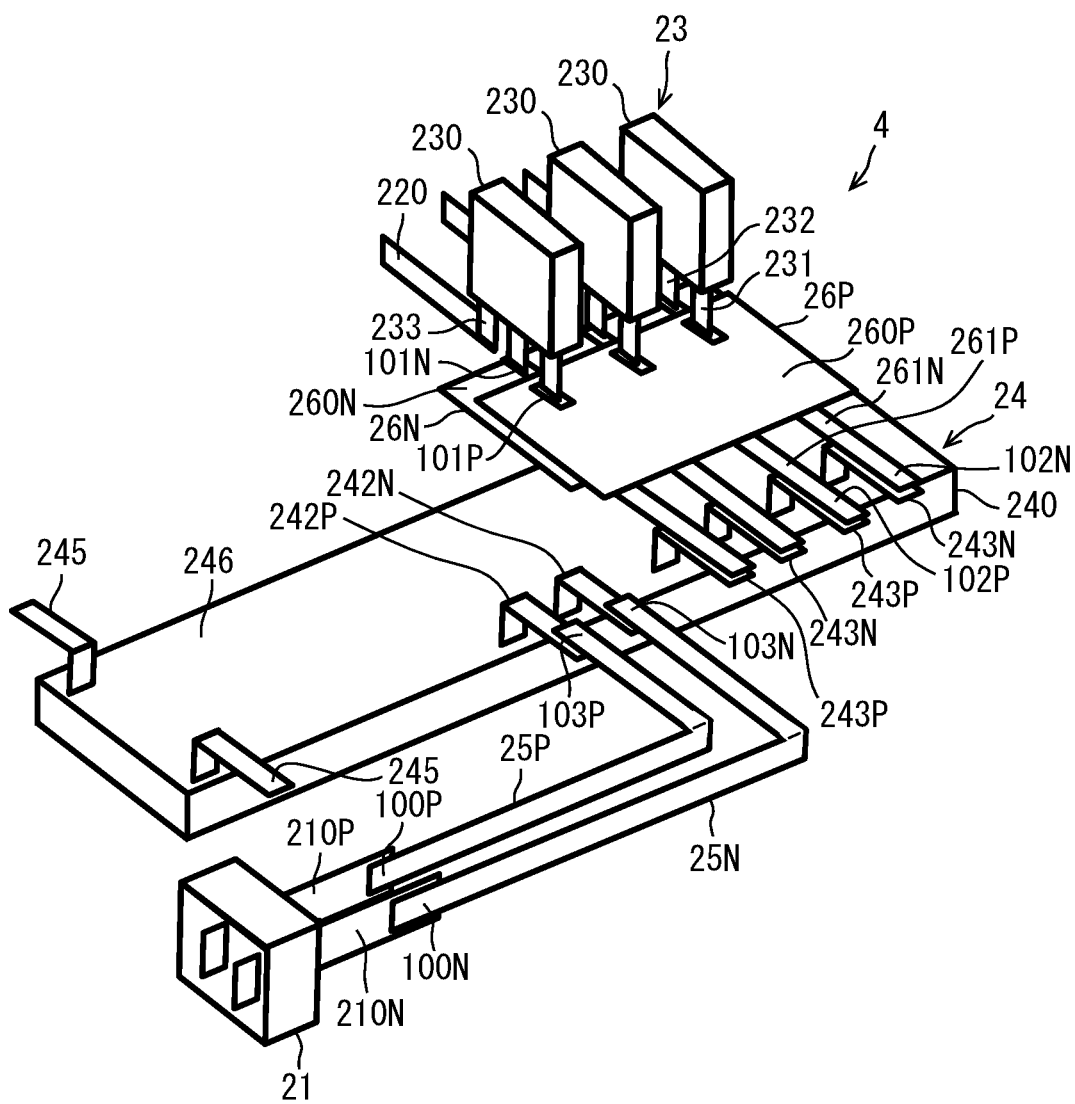
FIG. 3 is a perspective view showing the power conversion device shown in FIG. 1.

Next, an example of a configuration of the power conversion device 4 that satisfies the above-described parasitic inductance relationship will be described with reference to FIG. 2, FIG. 3 and FIG. 4. In FIG. 2, the power conversion device 4 is shown schematically. In FIG. 3, for easy understanding of a connection configuration, positions of an input terminal block 21 and a capacitor module 24 are shown in a shifted manner.

Figure 4:
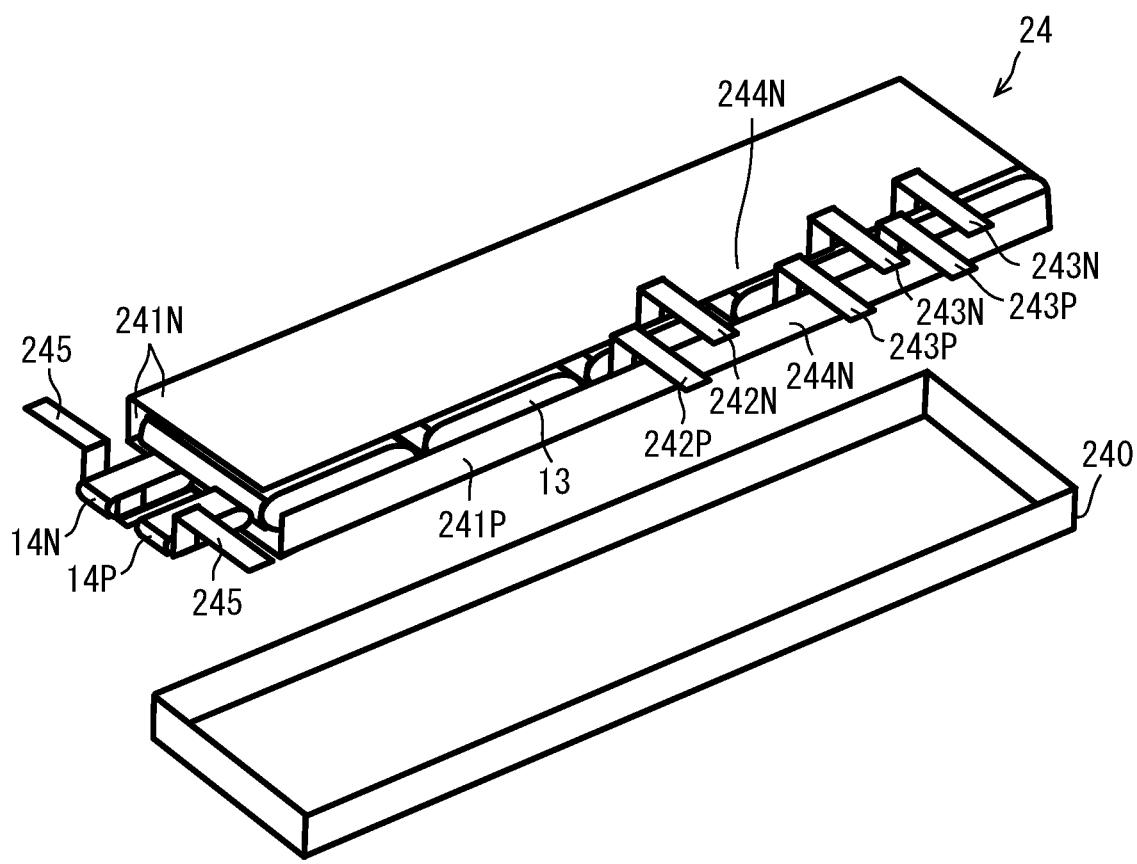
FIG. 4 is an exploded perspective view showing a configuration of a capacitor module shown in FIG. 1.

As shown in FIG. 2 to FIG. 4, the power conversion device 4 is provided with a case 20, an input terminal block 21, an output terminal block 22, a semiconductor module 23, a capacitor module 24, positive bus bars 25P and 26P, and negative bus bars 25N and 26N. In FIG. 2, the bus bars 25P, 26P, 25N and 26N are not shown for convenience.

The case 20 is configured by assembling a plurality of members. The case 20 accommodates various elements forming the power conversion device 4. At least one of the plurality of members forming the case 100 is made using a metal material. All of the plurality of members may alternatively be made using a metal material. A part of the plurality of members may be made using a metal material, and the other part of the plurality of members may be made using a resin material. In the first embodiment, the case 20 includes two members. Each of the two members is made by a die casting method using a metal material, specifically, an aluminum-based material.

As shown in FIG. 3, the input terminal block 21 has a positive terminal 210P and a negative terminal 210N for electrically connecting the DC power supply 2 and the power conversion device 4. The positive terminal 210P and the negative terminal 210N are held in a housing made of an electrically insulating material such as resin. A high voltage connector of the DC power supply 2 side is connected to the input terminal block 21. The positive electrode terminal 210P is connected to the positive electrode side of the DC power supply 2. The negative electrode terminal 210N is connected to the negative electrode side of the DC power supply 2. The input terminal block 21 is a high voltage input connector. The positive terminal 210P may be simply referred to as a P terminal. The negative terminal 210N may be simply referred to as an N terminal.

The output terminal block 22 has three-phase output bus bars 220, each of which is a conductive member for electrically connecting the motor generator 3 and the power conversion device 4. The output terminal block 22 has three-phase output bus bars 220 corresponding to the three-phase windings of the motor generator 3. The output bus bars 220 form the output wiring 12 described above. The output bus bar 220 is held in a housing formed of an electrically insulating material such as resin. The output terminal block 22 further has a current sensor (not shown). The current sensor is held in the housing. The current sensor detects a phase current flowing through the output bus bar 220.

The input terminal block 21 and output terminal block 22 are connected to the high voltage connector and the motor generator 3 through, for example, an opening of the case 20. As shown in FIG. 2, the case 20 has a substantially rectangular planar shape. In the case 20, the output terminal block 22 and the capacitor module 24 are arranged side by side. The input terminal block 21 is arranged on one of the four corners of the case 20 and on the capacitor module 24. The semiconductor module 23 is arranged on the capacitor module 24 on the same surface side as the input terminal block 21.

The semiconductor module 23 forms the inverter 11. The semiconductor module 23 is provided with at least one semiconductor device 230. In the first embodiment, each semiconductor device 230 forms a high side and low side arm circuit of one phase. The semiconductor module 23 is provided with three semiconductor devices 230 corresponding to the three-phase windings of the motor generator 3.

The semiconductor device 230 has two semiconductor chips. One of the semiconductor chips is formed of the switching element 110s and the diode 110d forming the high side arm. The other of the semiconductor chips is formed of the switching element 110s and the diode 110d, which form the low side arm. The two semiconductor chips are integrally sealed with a sealing resin body.

As shown in FIG. 3, the semiconductor device 230 has main terminals 231 to 233. The main terminals 231 to 233 are provided as power terminals. The main terminals 231 to 233 are electrically connected to the semiconductor chips inside the sealing resin bodies, respectively. The main terminals 231 to 233 protrude outside the sealing resin bodies, respectively. The main terminals 231 to 233 protrude from the same surfaces of the sealing resin bodies, respectively. The main terminal 231 is electrically connected to the collector electrode of the switching element 110s. The main terminal 231 is an external connection terminal connected to the positive polarity side wiring 10P described above. The main terminal 231 is provided as a positive terminal which is referred to as the P terminal.

The main terminal 232 is electrically connected to the emitter electrode of the switching element 111s. The main terminal 231 is an external connection terminal connected to the negative polarity side wiring 10N described above. The main terminal 232 is provided as a negative terminal which is referred to as the N terminal. The main terminal 233 is electrically connected to the emitter electrode of the switching element 110s and the collector electrode of the switching element 111s. The main terminal 233 is an external connection terminal connected to the output bus bar 220. The main terminal 233 is an output terminal which is referred to as an O terminal or an AC terminal.

The semiconductor device 230 has signal terminals (not shown) as external connection terminals different from the main terminals 231 to 233. The signal terminals include terminals for gates of the switching elements 110s and 111s. The signal terminal is provided as a control terminal. For example, the semiconductor device 230 is alternately arranged with a cooler (not shown). The semiconductor device 230 is thus sandwiched between the coolers provided on both sides. The semiconductor device 230 forms a stacked body together with the cooler. A refrigerant flows in the cooler. The semiconductor device 230 is thus cooled by the coolers from both sides.

The capacitor module 24 includes the smoothing capacitor 13 and the Y capacitors 14N and 14P. The capacitor module 24 is fixed to the case 20 by screw fastening or the like. As shown in FIG. 4, the capacitor module 24 includes a capacitor case 240, a negative polarity side bus bar 241N, a positive polarity side bus bar 241P, a GND bus bar 245 and a sealing body 246.

The capacitor case 240 accommodates the smoothing capacitor 13 and the Y capacitors 14N and 14P. The capacitor case 240 has, for example, a box shape whose one surface is open. The capacitor case 240 is made using, for example, a resin material.

The smoothing capacitor 13 is formed of a plurality of elements. The plurality of elements are arranged side by side in one direction. The arrangement direction of the plurality of elements is the longitudinal (long length) direction of the capacitor module 24. Each element has electrodes at both ends in the lateral (short length) direction of the capacitor module 24. Among the electrodes, the positive polarity side bus bar 241P is connected to the positive electrode, and the negative polarity side bus bar 241N is connected to the negative electrode. Hereinafter, the negative polarity side bus bar 241N and the positive polarity side bus bar 241P are simply referred to as bus bars 241N and 241P. The bus bars 241N and 241P are extended in the longitudinal direction.

The elements forming the Y capacitors 14N and 14P are arranged on one end side in the longitudinal direction. The Y capacitors 14N and 14P are arranged in the vicinity of the input terminal block 21. Each of the Y capacitors 14N and 14P is formed of one element. The Y capacitors 14N and 14P are arranged side by side in the lateral direction. The Y capacitors 14N and 14P are arranged so that the electrodes face each other.

In the Y capacitors 14N and 14P, GND bus bars 245 are connected to the electrodes on the back surfaces of the surfaces facing each other. The GND bus bars 245 are fixed to the case 20 by screw fastening or the like. The GND bus bar 245 is thus electrically connected to the case 20. The GND bus bar 245 is electrically connected to the body ground via the case 20 (case ground). In the Y capacitor 14P, the electrode on the opposite surface is electrically connected to the positive polarity side bus bar 241P. In the Y capacitor 14N, the electrode on the opposite surface is electrically connected to the negative polarity side bus bar 241N.

In the first embodiment, film capacitor elements are employed as elements forming the smoothing capacitor 13 and the Y capacitors 14N and 14P.

The bus bars 241N and 241P are provided as conductor plates or conductive members. The bus bars 241N and 241P of the first embodiment have input terminal portions 242N and 242P and output terminal portions 243N and 243P. The positive polarity side bus bar 25P is connected to the input terminal portion 242P. The negative polarity side bus bar 25N is connected to the input terminal portion 242N. The bus bars 241N and 241P have one corresponding input terminal portions 242N and 242P, respectively. The input terminal portions 242N and 242P are terminal portions on the DC power supply 2 side.

The positive polarity side bus bar 26P is connected to the output terminal portion 243P. The negative polarity side bus bar 26N is connected to the output terminal portion 243N. The bus bars 241N and 241P have two corresponding output terminal portions 243N and 243P, respectively. The output terminal portions 243N and 243P are terminal portions on the inverter 11 side. Hereinafter, the input terminal portion 242P and the output terminal portion 243P may be simply referred to as terminal portions 242P and 243P of the positive polarity side bus bar 241P, respectively. The input terminal portion 242N and the output terminal portion 243N may be simply referred to as terminal portions 242N and 243N of the negative polarity side bus bar 241N, respectively.

In the bus bars 241N and 241P, the input terminal portions 242N and 242P are provided between the connection terminals of the Y capacitors 14N and 14P and the output terminal portions 243N and 243P. The input terminal portions 242N and 242P are provided at positions closer to the output terminal portions 243N and 243P than the Y capacitors 14N and 14P are. The bus bars 241N and 241P have inter-terminal portions 244N and 244P that are portions between the input terminal portions 242N and 242P and the output terminal portions 243N and 243P, respectively.

The negative polarity side bus bar 241N is substantially L-shaped in a plane. The plate thickness direction of the negative polarity side bus bar 241N is substantially orthogonal to the lateral direction. The negative polarity side bus bar 241N has a connecting portion connected to the electrode of the smoothing capacitor 13 and an extending portion connected to the connecting portion. The extending portion extends from the connecting portion to the positive polarity side bus bar 241P side via a bent portion. The extending portion is located on one surface of the smoothing capacitor 13. One surface of the smoothing capacitor 13 is an opposite surface to a bottom surface of the capacitor case 240 in the smoothing capacitor 13. The input terminal portion 242N and the output terminal portion 243N are provided at an end portion on the positive polarity side bus bar 241P side in the extending portion.

The sealing member 246 is provided in the capacitor case 240 so as to seal the smoothing capacitor 13 and the Y capacitors 14N and 14P. The sealing member 246 is made of, for example, a resin material. The input terminal portions 242N and 242P, the output terminal portions 243N and 243P, and the GND bus bar 245 protrude from the sealing member 246 to the outside. The input terminal portions 242N and 242P, the output terminal portions 243N and 243P, and the GND bus bar 245 protrude from the opening of the capacitor case 240 to the outside. The terminal portions 242P and 243P of the positive bus bar 241P and the terminal portions 242N and 243N of the negative bus bar 241N are drawn out to the same end side in the lateral direction in the capacitor module 24.

The positive polarity side bus bars 25P and 26P and the negative polarity side bus bars 25N and 26N are referred to as conductive plates or conductive members. The bus bars 25N, 25P, 26N and 26P form at least a part of the power supply wiring 10 described above.

In the first embodiment, the positive polarity side bus bar 25P electrically connects the positive terminal 210P of the input terminal block 21 and the input terminal portion 242P of the capacitor module 24. The positive polarity side bus bar 26P electrically connects the output terminal portion 243P of the capacitor module 24 and the main terminal 231 of the semiconductor module 23.

The negative polarity side bus bar 25N electrically connects the negative electrode terminal 210N of the input terminal block 21 and the input terminal portion 242N of the capacitor module 24. The negative polarity side bus bar 26N electrically connects the output terminal portion 243N of the capacitor module 24 and the main terminal 232 of the semiconductor module 23.

The bus bars 26N and 26P on the output side of the capacitor module 24 have base portions 260N and 260P and extending portions 261N and 261P, respectively. In the positive polarity side bus bar 26P, a slit is formed in the base portion 260P. The base portion 260P and the main terminal 231 are connected in a state where the main terminal 231 of the semiconductor device 230 is inserted through the corresponding slit. The extending portion 261P extends in the lateral direction from one end of the base portion 260P. The extending portion 261P is connected to the corresponding output terminal portions 243P. The positive bus bar 26P has two extending portions 261P corresponding to the output terminal portions 243P.

Similarly, in the negative polarity side bus bar 26N, a slit is formed in the base portion 260N. The base portion 260N and the main terminal 232 are connected in a state where the main terminal 232 of the semiconductor device 230 is inserted through the corresponding slit. The extending portion 261N extends in the lateral direction from one end of the base portion 260N. The extending portion 261N is connected to the corresponding output terminal portions 243N. The negative polarity side bus bar 26N has two extending portions 261N corresponding to the output terminal portions 243N.

In the power conversion device 4, the power supply wiring 10 includes the bus bars 25N and 25P, the inter-terminal portions 244N and 244P of the bus bars 241N and 241P, and the bus bars 26N and 26P. In the bus bars 25N and 25P, the connection portions with the input terminal block 21 form power supply terminal portions 100N and 100P, and the connection portions with the input terminal portions 242N and 242P form capacitor terminal portions 103N and 103P. In the bus bars 26N and 26P, the connection portions with the output terminal portions 243N and 243P form capacitor terminal portions 102N and 102P, and the connection portions with the corresponding main terminals 231 and 232 form power terminal portions 101N and 101P. The inter-terminal portions 244N and 244P form portions between the capacitor terminal portions 102N and 102P and the capacitor terminal portions 103N and 103P in the power supply wiring 10, respectively.

<Summary of First Embodiment>

Figure 5:
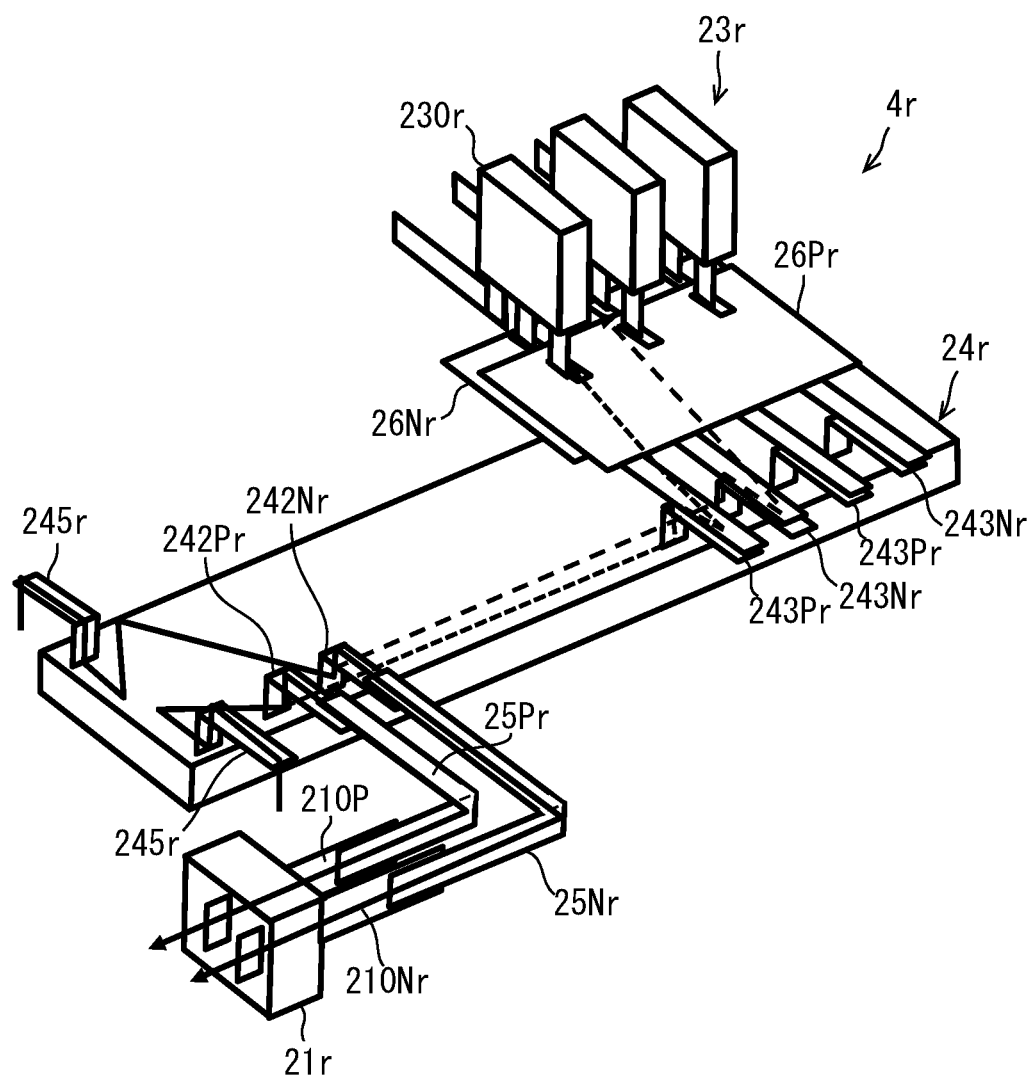
FIG. 5 is a diagram illustrating a flow of common mode noise in a comparison example.

FIG. 5 shows a configuration of a comparison example of a power conversion device. In the comparison example, "r" is attached to the end of the reference numerals of related elements in the first embodiment.

In a power conversion device 4r of the comparative example, input terminal portions 242Nr and 242Pr of a capacitor module 24r are provided in the vicinity of a Y capacitor. The input terminal portions 242Nr and 242Pr are provided in the vicinity of a GND bus bar 245r in the longitudinal direction of a capacitor module 24r. Thereby, in a power supply wiring, parasitic inductances of bus bars 25Nr and 25Pr are made smaller than parasitic inductance which is from input terminal portions 242Nr and 242Pr to a semiconductor module 23r.

Therefore, as indicated by solid arrows in FIG. 5, common mode noise leaks from the GND bus bar 245r to the outside through the input terminal portions 242Nr and 242Pr, the bus bars 25Nr and 25Pr, and an input terminal block 21r. As shown by a broken line in FIG. 5, the common mode noise cannot be completely returned to the semiconductor module 23r that is a noise source.

On the other hand, in the first embodiment, the input terminal portions 242N and 242P are provided at positions closer to the output terminal portions 243N and 243P than the Y capacitors 14P and 14N are, respectively. For example, the wiring lengths of the bus bars 25N and 25P are longer than those of the comparative example. In addition, the wiring lengths of the bus bars 26N and 26P and the inter-terminal portions 244N and 244P are shorter than those of the comparative example. The parasitic inductances of the bus bars 26N and 26P and the inter-terminal portions 244N and 244P are made smaller than the parasitic inductances of the bus bars 25N and 25P. In the power supply wiring 10, parasitic inductances L1 from the capacitor terminal portions 103N and 103P to the power terminal portions 101N and 101P are made smaller than parasitic inductances L2 from the capacitor terminal portions 103N and 103P to the power supply terminal portions 100N and 100P.

Therefore, the common mode noise (common mode current) is unlikely to flow from the input terminal portions 242N and 242P to the bus bars 25N and 25P, that is, the DC power supply 2 side. Most of the common mode noise flows from the GND bus bar 245 to the semiconductor module 23 via the output terminal portions 243N and 243P, as indicated by solid arrows in FIG. 6. Even if the common mode noise leaks to the bus bars 25N and 25P, the common mode noise is little. Therefore, according to the power conversion device 4 of the first embodiment, the common mode noise can be absorbed effectively.

In the first embodiment, the Y capacitors 14N and 14P are arranged so that the electrodes thereof face each other. Thereby, the magnetic coupling between the Y capacitor 14P and the Y capacitor 14N can be suppressed. Therefore, it is possible to suppress the common mode noise from leaking out of the power conversion device 4 due to magnetic coupling. Further, in the capacitor module 24, an increase in the physique in the height direction can be suppressed.

Second Embodiment

The second embodiment is a modification example of the first embodiment. In the first embodiment, the input terminal portions 242N and 242P and the output terminal portions 243N and 243P are individually provided in the capacitor module 24. Instead, the terminal portions of the capacitor module 24 may be shared.

Figure 7:
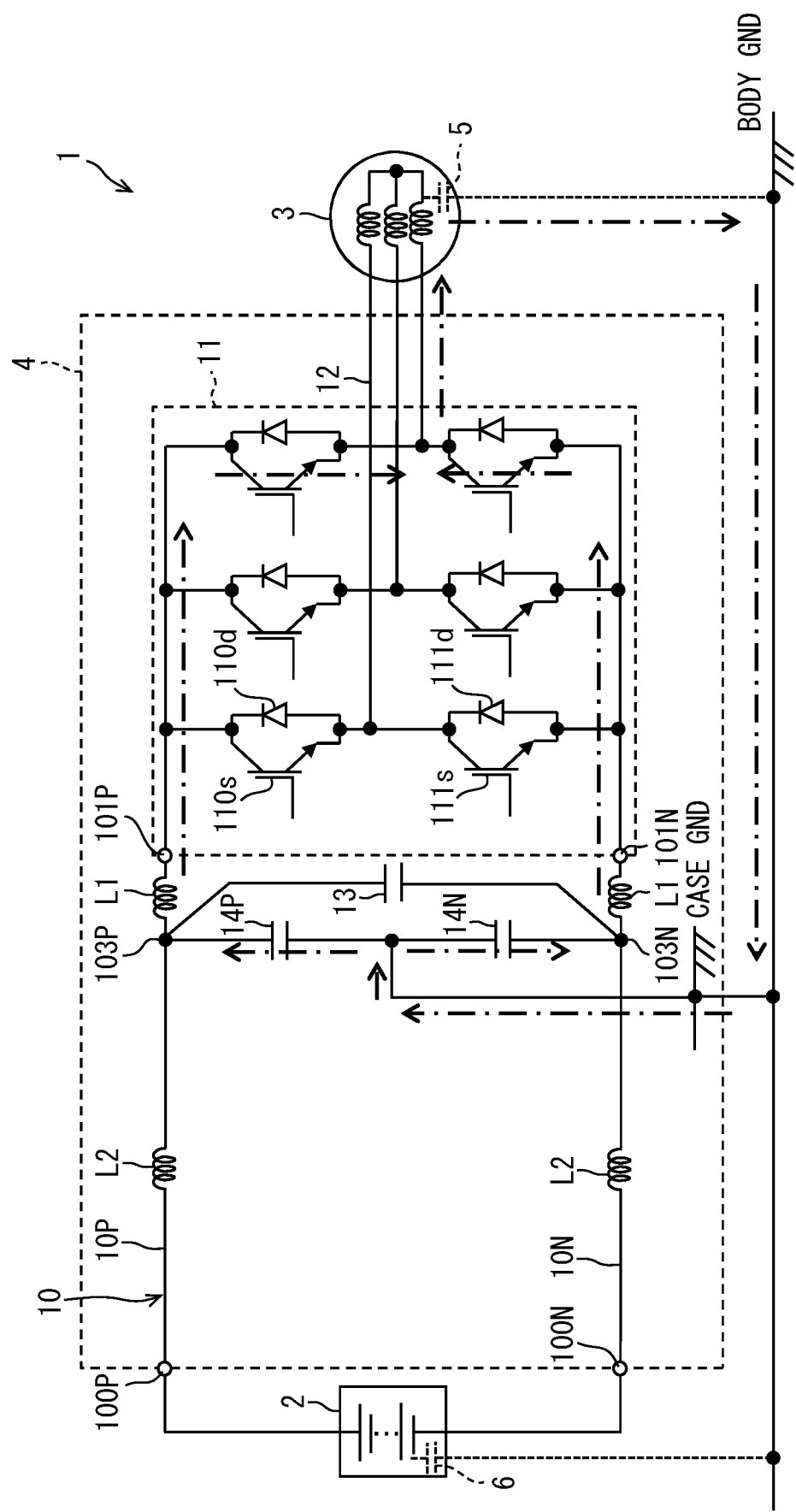
FIG. 7 is a diagram illustrating a circuit configuration of a power conversion device according to a second embodiment.

FIG. 7 shows a circuit configuration of the power conversion device 4 according to the second embodiment. In the power conversion device 4, the connection portions between the smoothing capacitor 13 and the Y capacitors 14N and 14P are common in the power supply wiring 10. That is, the smoothing capacitor 13 and the Y capacitors 14N and 14P are connected to the same capacitor terminal portion. Specifically, the smoothing capacitor 13 is connected to capacitor terminal portions 103N and 103P. The power supply wiring 10 does not have capacitor terminal portions 102N and 102P between the capacitor terminal portions 103N and 103P and the power terminal portions 101N and 101P, respectively. In the power supply wiring 10, the parasitic inductance L1 is set to be smaller than the parasitic inductance L2.

Figure 6:
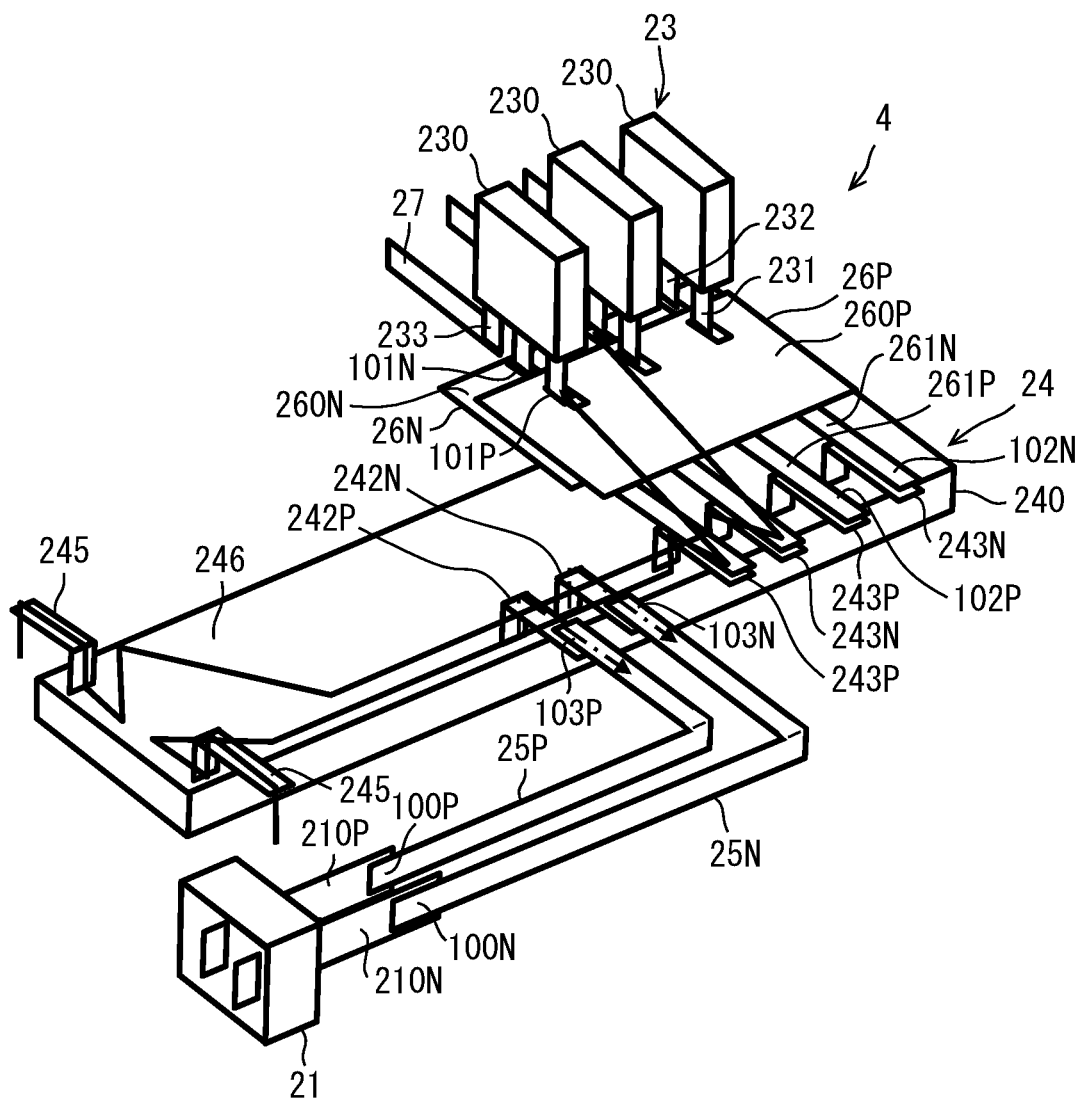
FIG. 6 is a diagram illustrating a flow of common mode noise in the first embodiment.
Figure 8:
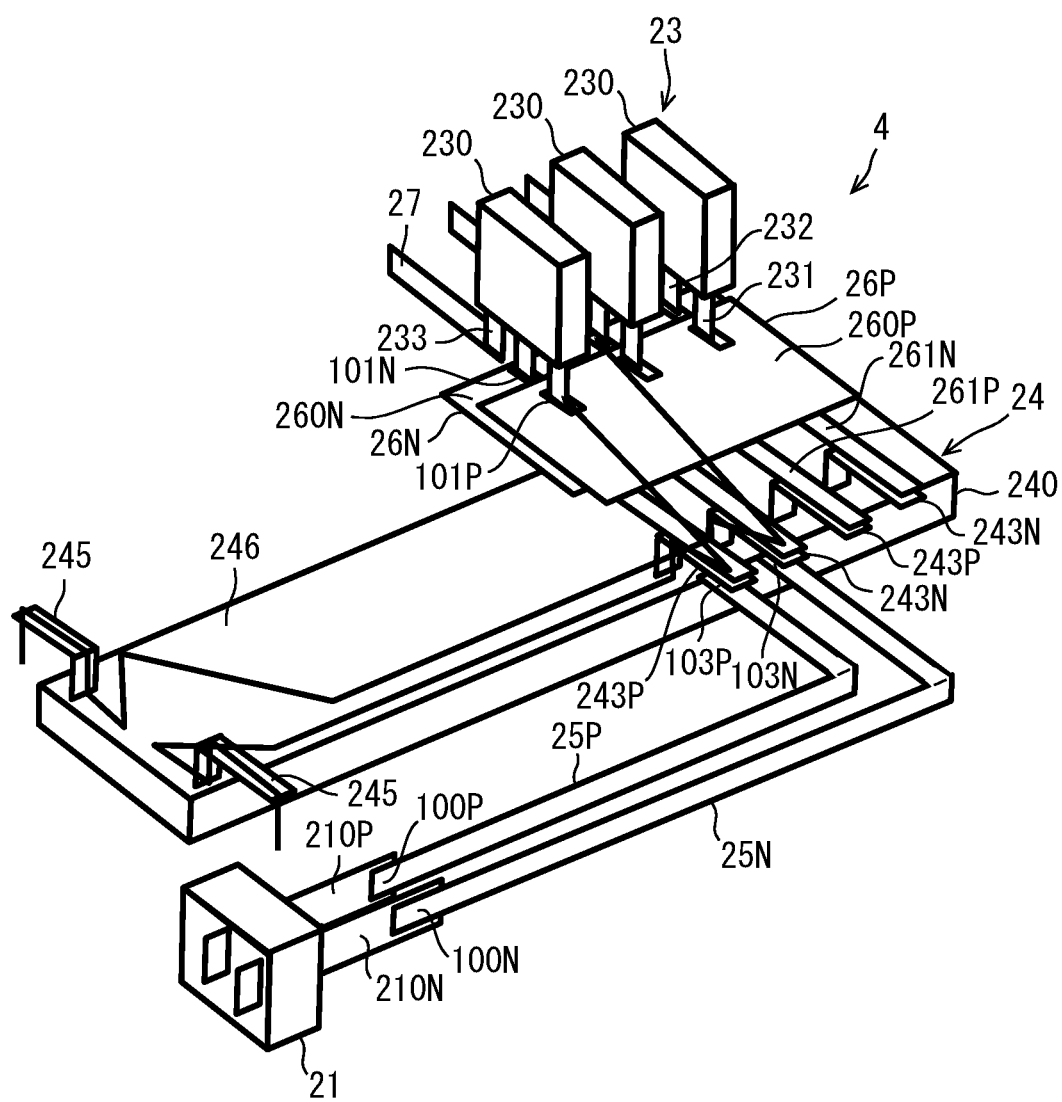
FIG. 8 is a perspective view showing the power conversion device shown in FIG. 7.

FIG. 8 shows a configuration of the power conversion device 4 in a manner corresponding to FIG. 6. As shown in FIG. 8, the capacitor module 24 does not have the input terminal portions 242N and 242P. The positive polarity side bus bar 25P is connected to one of the output terminal portions 243P. The negative polarity side bus bar 25N is connected to one of the output terminal portions 243N. The output terminal portions 243N and 243P also serve as the input terminal portions 242N and 242P, respectively. In the bus bars 25N and 25P, the connection portions with the output terminal portions 243N and 243P form the capacitor terminal portions 103N and 103P, respectively. The capacitor module 24 does not have the inter-terminal portions 244N nor 244P. The output terminal portions 243N and 243P are provided as the external connection terminals. The end portions of the bus bars 25N and 25P on the capacitor module 24 side may be branched and connected to all of the output terminal portions 243N and 243P, respectively.

<Summary of Second Embodiment>

In the second embodiment, the positive polarity side bus bars 25P and 26P are connected to the same output terminal portion 243P. The negative polarity side bus bars 25N and 26N are connected to the same output terminal portion 243N. As a result, the wiring lengths of the bus bars 25N and 25P are longer than in the first embodiment. The parasitic inductance L2 becomes larger and the parasitic inductance L1 becomes smaller. Therefore, compared to the first embodiment, the common mode noise is less likely to leak to the bus bars 25N and 25P. Therefore, according to the power conversion device 4 of the second embodiment, the common mode noise can be absorbed more effectively. In FIG. 8, the common mode noise is indicated by the solid line arrow.

When the switching elements 110s and 111s are in on-states, a DC current flows through the power supply wiring 10. In the first embodiment, the power supply wiring 10 is configured to include a part of the bus bars 241N and 241P, specifically the inter-terminal portions 244N and 244P, of the capacitor module 24. A part of the main circuit wiring through which the DC current flows is provided in the capacitor case 240.

In the second embodiment, all portions from the power supply terminal portions 100N and 100P to the connection portions of the smoothing capacitor 13 (output terminal portions 243N and 243P) in the power supply wiring 10 are arranged outside the capacitor case 240. The bus bars 25N and 25P are connected to the output terminal portions 243N and 243P. The main circuit wiring through which the DC current flows is provided in the capacitor case 240. Therefore, it is possible to suppress heat generated by the DC current flowing through the power supply wiring 10 from being transferred to the smoothing capacitor 13 and the Y capacitors 14N and 14P. The influence of heat on the smoothing capacitor 13 and the Y capacitors 14N and 14P can be thus reduced.

Other Embodiment

The disclosures in this specification and drawings etc. are not limited to the exemplified embodiments. The disclosure encompasses the illustrated embodiments and modifications made based on the illustrated embodiments by those skilled in the art. For example, the disclosure is not limited to the combinations of parts and/or elements shown in the embodiments. The disclosures may be implemented in various combinations. The disclosures may have additional parts that may be added to the embodiment. The disclosures encompasses omissions of parts and/or elements of the embodiments. The disclosure encompasses replacement or combination of components, elements between one embodiment and another. The disclosed technical scope is not limited to the description of the embodiments. Several technical scopes disclosed are indicated by descriptions in the claims and should be understood to include all modifications within the meaning and scope equivalent to the descriptions in the claims.

The disclosures in the specification, drawings and the like are not limited by the description of the claims. The disclosures in the specification, the drawings, and the like encompass the technical ideas described in the claims, and further extend to a wider variety of technical ideas than those in the claims. Therefore, various technical ideas can be extracted from the disclosure of the specification, the drawings and the like without being limited to the description of the claims.

Although examples of the IGBTs 110s and 111s are shown as the switching elements, the switching elements are not limited to the IGBTs. For example, MOSFETs may be employed. Parasitic diodes may be used as the diodes 110d and 111d.

The power conversion device 4 may be applied to a drive system including two motor generators. In this case, the power conversion device 4 includes two inverters 11.

The configuration of the power conversion device 4 is not limited to the above examples.

For example, the example in which the IGBT 110s and the diode 110d are formed on one semiconductor chip is shown. That is, although an example of RC-IGBT has been shown, the present disclosure is not limited to this. The IGBTs 110s and 111s and the corresponding diodes 110d and 111d may be formed in separate chips, respectively.

Although an example in which the GND bus bar 245 is individually provided by the Y capacitors 14N and 14P is shown, the present disclosure is not limited to such a configuration. Each GND bus bar 245 may be connected in the capacitor case 240, and the common GND bus bar 245 may protrude from the capacitor case 240.

The number of output terminal portions 243N and 243P is not limited to the above example. The output terminal portions 243N and 243P may be provided one by one, or three or more output terminal portions may be provided. The same applies to the extended portions 261N and 261P of the bus bars 26N and 26P. Similarly to the base portions 260N and 260P of the bus bars 26N and 26P, the extending portions 261N and 261P may be provided with respective slits, and the output terminal portions 243N and 243P may be inserted through the slits for connection.

Although an example in which the bus bars 25N and 25P on the DC power supply 2 side and the bus bars 26N and 26P on the inverter 11 side are individually provided is shown, the disclosure is not limited to such a configuration.

The arrangement of other elements of the power conversion device 4 in the case 20 is not limited to the above-described example. At least the parasitic inductance L1 need be arranged to be smaller than the parasitic inductance L2.

Although an example in which the input terminal block 21 and the output terminal block 22 are separately provided is shown, these terminal blocks may be integrally provided as one terminal block.

What is claimed is:
1. A power conversion device comprising:
a power conversion portion including a switching element for power conversion between a DC power and an AC power;
a first capacitor for smoothing the DC power supplied from a DC power supply;
a second capacitor for removing noise; and
a wiring including a positive wiring connected to a positive polarity side of the DC power supply and a negative wiring connected to a negative polarity side of the DC power supply and electrically connecting the DC power supply and the power conversion portion,
wherein a first parasitic inductance of the wiring between a first connection portion, to which the power conversion portion is connected, and a second connection portion, to which the second capacitor is connected, is smaller than a second parasitic inductance of the wiring between a third connection portion, to which the DC power supply is connected, and the second connection portion.

2. The power conversion device according to claim 1, further comprising:
a case for accommodating the first capacitor and the second capacitor,
wherein the first capacitor, the second capacitor and the case form a capacitor module.

3. The power conversion device according to claim 2, wherein:
the capacitor module includes an external connection terminal; and portions including the first connection portion of the wiring and portions including the third connection portion of the wiring are connected to the external connection terminal.

4. The power conversion device according to claim 3, wherein:
the second capacitor includes a positive polarity side capacitor connected to the positive wiring and a negative polarity side capacitor connected to the negative wiring; and
the positive capacitor and the negative capacitor are arranged with respective electrodes facing each other.

5. The power conversion device according to claim 3, wherein:
portions of the wiring between the third connection portion and the first capacitor are arranged outside the case.

6. The power conversion device according to claim 2, wherein:
portions of the wiring between the third connection portion and the first capacitor are arranged outside the case.

7. The power conversion device according to claim 6, wherein:
the second capacitor includes a positive polarity side capacitor connected to the positive wiring and a negative polarity side capacitor connected to the negative wiring; and
the positive polarity side capacitor and the negative polarity side capacitor are arranged with respective electrodes facing each other.

8. The power conversion device according to claim 2, wherein:
the second capacitor includes a positive polarity side capacitor connected to the positive wiring and a negative polarity side capacitor connected to the negative wiring; and
the positive capacitor and the negative capacitor are arranged with respective electrodes facing each other.

9. The power conversion device according to claim 1, wherein:
the second capacitor includes a positive polarity side capacitor connected to the positive wiring and a negative polarity side capacitor connected to the negative wiring; and
the positive polarity side capacitor and the negative polarity side capacitor are arranged with respective electrodes facing each other.

10. The power conversion device according to claim 1, wherein:
a length of the wiring between the first connection portion, to which the power conversion portion is connected, and the second connection portion, to which the second capacitor is connected, is shorter than a length of the wiring between the third connection portion, to which the DC power supply is connected, and the second connection portion.

* * * * *